(12) United States Patent
Mickowski

(10) Patent No.: US 11,959,521 B1
(45) Date of Patent: Apr. 16, 2024

(54) CLUTCH ACTUATING DEVICE

(71) Applicant: John R. Mickowski, Warwick, NY (US)

(72) Inventor: John R. Mickowski, Warwick, NY (US)

( * ) Notice: Subject to any disclaimer, the term of this patent is extended or adjusted under 35 U.S.C. 154(b) by 0 days.

(21) Appl. No.: 18/212,489

(22) Filed: Jun. 21, 2023

(51) Int. Cl.
*F16D 25/08* (2006.01)
*F16D 48/02* (2006.01)

(52) U.S. Cl.
CPC .......... *F16D 25/088* (2013.01); *F16D 48/02* (2013.01); *F16D 2048/0212* (2013.01); *F16D 2048/0254* (2013.01)

(58) Field of Classification Search
CPC ................ F16D 25/088; F16D 48/02; F16D 2048/0212; F16D 2048/0254; F16D 2048/0221
See application file for complete search history.

(56) References Cited

U.S. PATENT DOCUMENTS

| | | | |
|---|---|---|---|
| 4,442,929 A * | 4/1984 | Uchida | F16D 25/14 91/401 |
| 5,061,016 A | 10/1991 | Hirobe | |
| 5,273,143 A | 12/1993 | Voss et al. | |
| 5,330,259 A | 7/1994 | Ravndal et al. | |
| 5,767,389 A * | 6/1998 | LaFountain | F15B 19/00 73/39 |
| 5,906,256 A | 5/1999 | Hayashi et al. | |
| 6,196,369 B1 | 3/2001 | Willert et al. | |
| 7,404,292 B2 | 7/2008 | Kremer | |
| 7,931,135 B2 * | 4/2011 | Dougan | F16D 48/04 192/85.25 |
| 8,522,942 B2 | 9/2013 | Bell et al. | |
| 8,544,624 B2 | 10/2013 | Grethel | |
| 9,016,454 B2 * | 4/2015 | Hemphill | F16D 25/0638 192/85.31 |
| 9,803,702 B2 | 10/2017 | Heubner | |
| 10,767,664 B2 | 9/2020 | Mickowski | |

* cited by examiner

*Primary Examiner* — Huan Le
(74) *Attorney, Agent, or Firm* — Howson & Howson LLP

(57) ABSTRACT

A clutch actuating device includes an actuating cylinder having a piston, a multiplier cylinder, and at least one rod extending from the multiplier cylinder to the piston of the actuating cylinder. The actuating cylinder has a rod-side chamber and a clutch actuation chamber with the piston extending therebetween. The rod-side chamber has a port for connection to a first pressure source, and the clutch actuation chamber has a port for connection to a slave cylinder of a hydraulic clutch. A passage interconnects the rod-side chamber with the clutch actuation chamber, and a check-valve is located in the passage. The check-valve only permits flow between the rod-side chamber and the clutch actuation chamber for purposes of compensating for changes of volume of fluid due to temperature change and only when the piston is retracted to an idle position.

20 Claims, 4 Drawing Sheets

CLUTCH ACTUATING DEVICE

BACKGROUND

The present invention relates to a clutch actuating device for forming an interconnection between a master cylinder and a slave cylinder of a hydraulic clutch mechanism providing a drive connection between an engine and a transmission of a motorized vehicle or like equipment.

The typical fluid used in hydraulic actuated clutches and brakes commonly used in cars, trucks, motorcycles and other equipment has a positive volumetric expansion coefficient, such that the fluid expands with increases in temperature and contracts with decreases in temperature. It is important for the device used to operate the master cylinder to prevent fluid expansion or contraction from causing variation in the lever or pedal position where the associated master cylinder develops pressure to actuate a slave cylinder. This is particularly important for human operators of such equipment, which rely on the "feel" developed from experience of where the pedal or lever first starts to actuate the clutch or brakes, in order to operate equipment in an efficient manner.

In a simple system consisting of a master cylinder providing pressurized fluid to a slave actuating cylinder, a passage may be provided in the master cylinder between its reservoir and the fluid line to the slave cylinder. This passage is closed as the master cylinder piston advances to provide pressurized fluid. When the master cylinder piston is retracted, the passage is opened. The open passage allows more fluid to enter the line to the slave actuating cylinder if the fluid volume has decreased because of a temperature decrease. Conversely, if temperature has risen, the open passage permits excess fluid to escape into the reservoir, thus compensating for changes in volume each time the master cylinder is retracted to its idle position.

However, in a more complex system which may use a method of multiplying the pressure produced by the master cylinder before sending fluid to the slave cylinder, such as disclosed in U.S. Pat. No. 10,767,664 B2 of Mickowski, the normal fluid circuit between the actuating and slave cylinders is closed and isolated from the master cylinder reservoir. Therefore, in such an arrangement, there can be a variation in the master cylinder piston position versus slave cylinder piston as temperature varies, preventing a consistent "feel" by the operator.

SUMMARY

According to an aspect of the present invention, a clutch actuating device includes an actuating cylinder having a piston, a multiplier cylinder having at least one port for connection to a secondary pressure source, and a rod or a series of interconnecting rods extending from the multiplier cylinder to the piston of the actuating cylinder. The actuating cylinder has a rod-side chamber through which the rod or rods pass and a clutch actuation chamber. The piston separates the rod-side chamber from the clutch actuation chamber within the actuating cylinder. The rod-side chamber has a port for connection to a first pressure source, and the clutch actuation chamber has a port for connection to a slave cylinder of a hydraulic clutch. A passage having a check-valve interconnects the rod-side chamber with the clutch actuation chamber. The check-valve only permits flow between the rod-side chamber and the clutch actuation chamber for purposes of compensating for changes of volume of fluid due to temperature change and only when the piston is retracted to an idle position.

BRIEF DESCRIPTION OF THE DRAWINGS

The foregoing and other objects, features and advantages of the embodiments disclosed herein should become apparent from the following description when taken in conjunction with the accompanying drawings.

DETAILED DESCRIPTION

Figure 1:
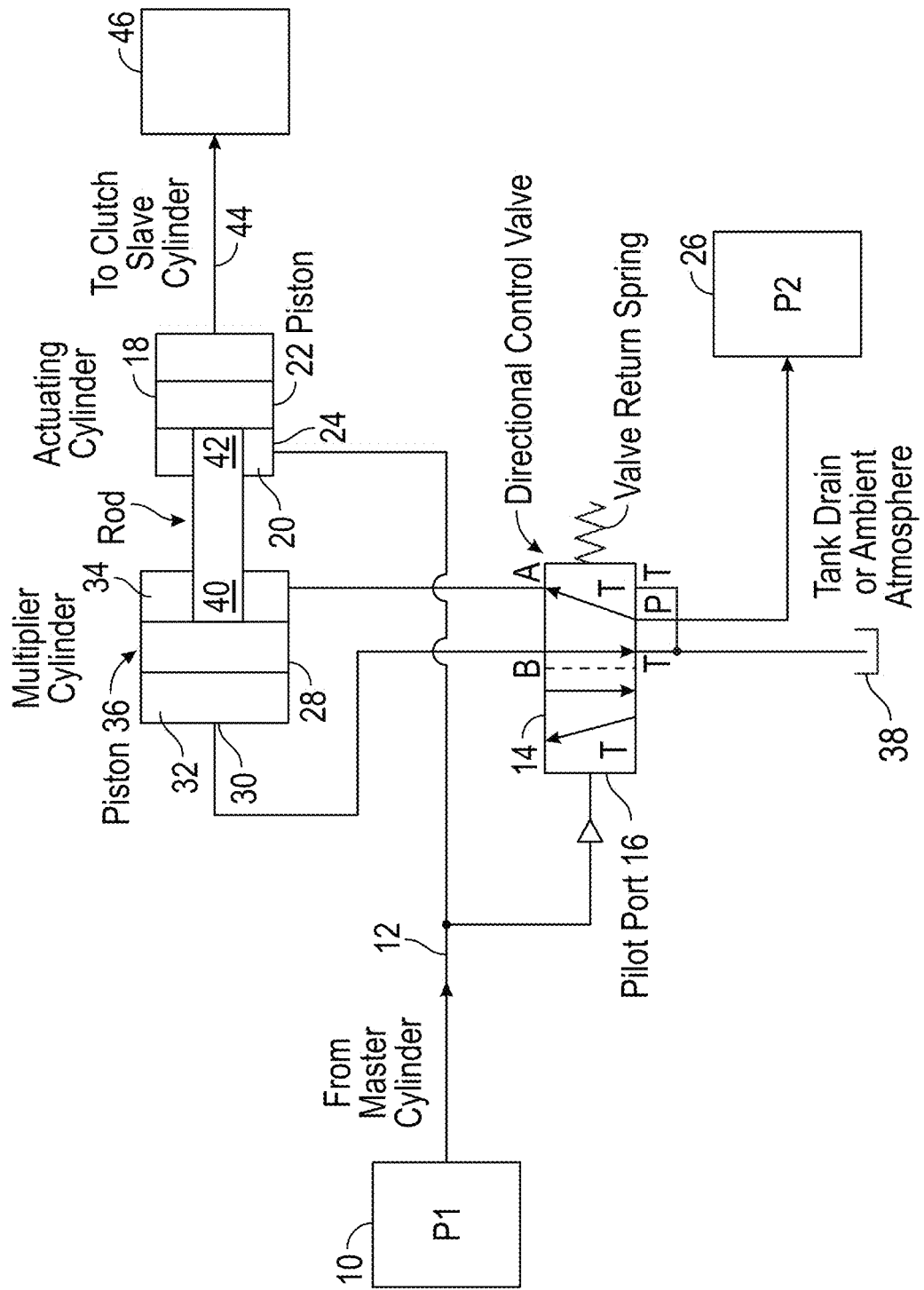
FIG. 1 is a schematic view of a clutch actuating device installed between a master cylinder and a slave cylinder of a clutch in a condition in which clutch plates of the clutch are engaged.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known devices, apparatus, methods and structures have not been described in detail so as not to unnecessarily obscure the embodiments.

In general, a motor vehicle having manual transmission may be equipped with a mechanical clutch system or a hydraulic clutch system. Both systems share the same function, which is to transfer the rotational movement of the engine to the transmission. The motor vehicle may be a motorcycle, truck, automobile, all-terrain vehicle (ATV), or like motorized vehicle or any other equipment having a clutch system. Although a clutch actuating device for a motorcycle is discussed below, the clutch actuating device according to the present invention may be used in any clutch system and is not limited to motorcycles.

On a motorcycle, a clutch is typically operated by a hand lever on the left handlebar. Typically, no pressure on the lever means that clutch plates are engaged (driving), while pulling the lever back towards the rider disengages the clutch plates through cable or hydraulic actuation, allowing the rider to shift gears or coast.

The clutch may include a series of spinning discs that move a very short distance (a fraction of an inch) to couple and uncouple power moving from the engine to the wheel. This movement is transferred from the lever to the clutch typically through either a cable that moves within a stationary housing, or via a master cylinder exerting pressure on fluid to move a corresponding slave cylinder at the clutch. Thus, the clutch is able to temporarily disconnect the engine from the transmission and such disconnection is essential for safe operation of a motorcycle.

Accordingly, on a motorcycle, the clutch lever is pulled to disengage the transmission, and is then slowly let out to enable the transmission gears to engage with the engine so that the motorcycle moves under power. Inside the clutch, there are a series of friction plates that are generally round, with a hole in the center, and that fit over a clutch hub. Pulling the clutch lever releases the pressure that keeps the friction plates touching tight against each other, allowing the flywheel to spin freely. Releasing the lever results in the friction plates catching on each other and engaging the engine to the transmission. Accordingly, when changing gears, the transmission is disengaged from the engine for a moment, gear alignment is switched, then reengaged. The friction plates enable a rider to negotiate the disengagement and reengagement smoothly.

In general, a hydraulic clutch operates under fluid pressure and may include the following basic components: a master cylinder, a slave cylinder, a clutch fork, a flywheel, a clutch plate, a pressure plate, and a clutch release bearing. The clutch moves with the engine, allowing a gradual and smooth transfer of power from the engine to the transmission, through the flywheel. When the clutch is actuated, it pushes a rod that is linked to the master cylinder, which is connected to a hydraulic fluid reservoir. Hydraulic fluid is then forced to flow under pressure into the clutch slave cylinder, and the hydraulic pressure formed in the process activates a pushrod in the slave cylinder. The pushrod moves against the clutch fork pushing the clutch release bearing. Pressure may be further transferred to a diaphragm spring, pulling the pressure plate away from the clutch plate. At this point, the clutch is no longer engaged to the engine. The power is now interrupted, and the driver can coast and/or shift into another gear without causing damage to the transmission.

A power clutch actuating device may be used that multiplies the pressure delivered by a hydraulic clutch actuator. For instance, see the disclosure provided by U.S. Pat. No. 10,767,664 B2 issued to Mickowski which is incorporated herein by reference. The power clutch actuating device is connected between the master cylinder and slave cylinder of a conventional hydraulic clutch. See FIGS. 1 and 2.

As discussed in U.S. Pat. No. 10,767,664 B2 issued to Mickowski, the effort required by a motorcycle driver to operate a hydraulic clutch lever, particularly on a larger motorcycle, is approximately the same as the conventional mechanical cable driven variety. However, embodiments of a clutch including a power clutch actuating device require significantly less effort to use. As a result, operating a motorcycle equipped with a power clutch actuating device is much less tiring and far more enjoyable.

Figure 2:
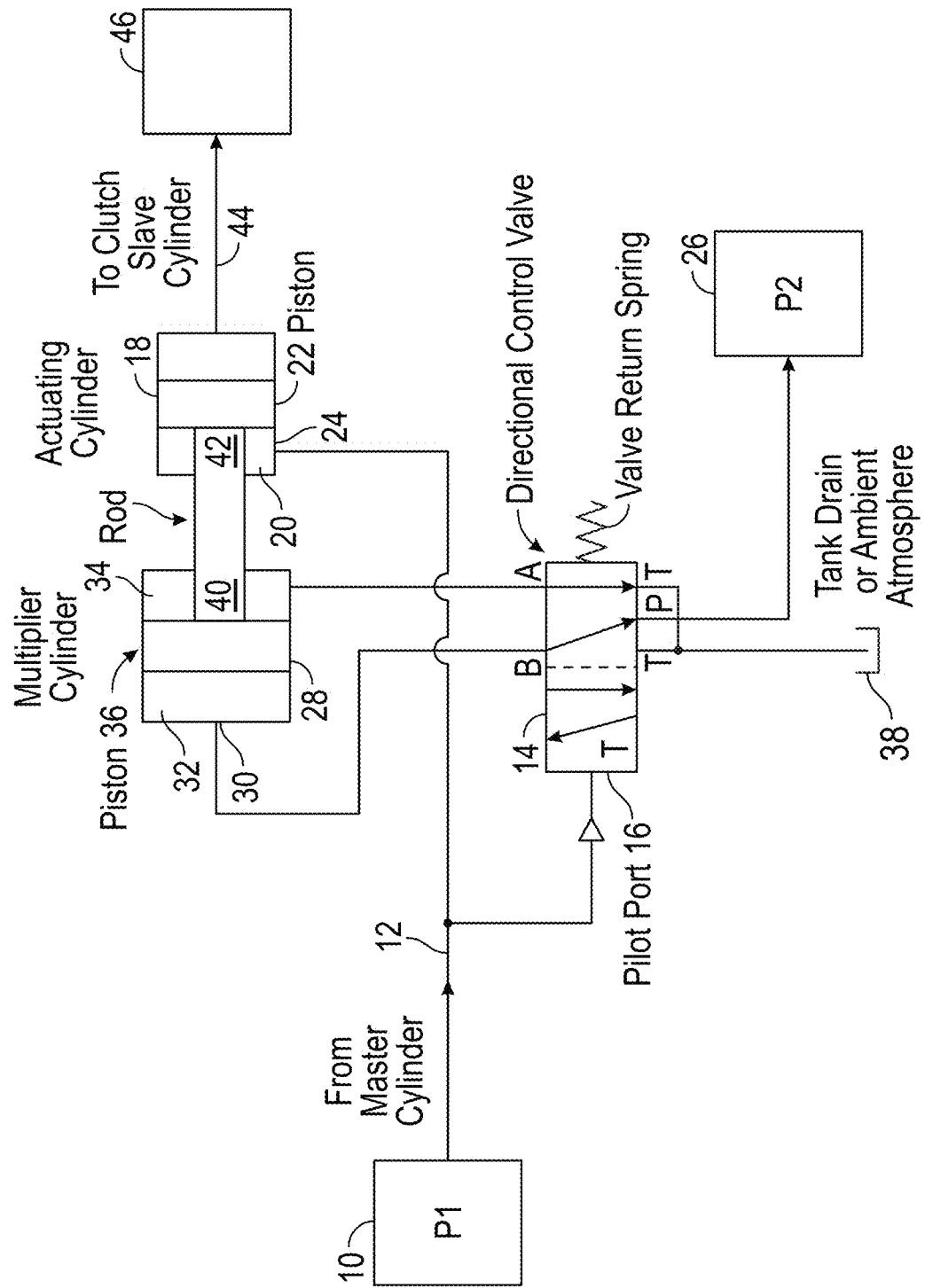
FIG. 2 is a schematic view of the clutch actuating device of FIG. 1 shown in a condition in which clutch plates of the clutch are disengaged.

Referring to FIGS. 1 and 2 with respect to the operation of a power clutch actuating device, a secondary pressure source (P2) is used to supply additional power to actuate a clutch, thereby reducing the pressure required from the master cylinder (P1), and in turn reducing the gripping force required on the handlebar lever of a motorcycle. The secondary source (P2) may be provided by the motor's lubrication oil pressure source, or other source, such as, for example, a compressed air supply.

FIG. 1 shows the condition of the power clutch actuating device before a clutch level is pulled or after a clutch lever is released (i.e., pressure (P1) from the master cylinder is effectively equal to zero). This is the "idle" condition. In contrast, FIG. 2 shows the condition of the power clutch actuating device when a clutch lever is pulled (i.e., when pressure (P1) is applied by the master cylinder).

By way of example, when a handlebar lever (not shown) of a motorcycle is pulled in to disengage the clutch (see FIG. 2), a master cylinder 10 of the clutch forces fluid under pressure (P1) into a hose or other fluid conduit 12 interconnected to a power clutch actuating device. In the illustrated embodiment, the hose 12 is connected to a pilot port 16 of a directional control valve 14 and a rod-side chamber 20 of an actuating cylinder 18 defined by a piston 22 within the actuating cylinder 18. This places the directional control valve 14 in a condition as shown in FIG. 2.

Pressure (P1) from the master cylinder 10 applied to the pilot port 16 of the directional control valve 14 causes an internal shift of the passages in the directional control valve 14 and simultaneously applies force to the piston 22 of the actuating cylinder 18 via a fluid inlet 24 of the rod-side chamber 20 of the actuating cylinder 18. When the directional control valve 14 shifts based on the applied pressure (P1) as stated above, a second source 26 of pressure (P2) is thereby connected and applied to a fluid inlet 30 of a piston-side chamber 32 of a multiplier cylinder 28 via the directional control valve 14. In addition, fluid in a rod-side chamber 34 of the multiplier cylinder 28 is permitted to drain or flow to a tank 38 or into ambient atmosphere via the directional control valve 14, which thereby releases any back pressure in the multiplier cylinder 28. The multiplier cylinder includes a piston 36 which defines and separates the piston-side and rod-side chambers, 32 and 34, of the multiplier cylinder 28.

The multiplier cylinder 28 has a rod 40 that is physically connected to a rod 42 of the actuating cylinder 18. Rods, 40 and 42, may be configured as a single rod or a series of interconnected rods. Thus, the force (P2) provided by the rod 40 of the multiplier cylinder 28 adds to the force (P1) applied by the master cylinder 10 to the piston 22 of the actuating cylinder 18. The combination of the two forces (P1+P2) on the piston 22 of the actuating cylinder 18 delivers a required clutch actuation fluid pressure from the piston 22 of the actuator cylinder 18, which is in turn connected by a hose or other fluid conduit 44 to the slave cylinder 46 of the clutch, thereby releasing the clutch.

When the handlebar lever is released to engage the clutch (see FIG. 1), the pressure (P1) from the master cylinder 10 is simultaneously removed from the pilot port 16 of the directional control valve 14 and the rod-side chamber 20 of the actuating cylinder 18 (i.e., pressure (P1) is effectively equal to zero and this is referred to as the "idle" condition). This alters the configuration of the passages within the directional control valve 14 such that, fluid from the piston-side chamber 32 of the multiplier cylinder 28 is permitted to drain to the tank or ambient atmosphere 38 via the directional control valve 14 and fluid at pressure (P2) is directed to the rod-side chamber 34 of the multiplier cylinder 28 to return the piston 36 and rod 40 to their original or normal positions. At the same time, back pressure from the clutch slave cylinder 46 pushes the piston 22 of the actuating cylinder 18 back along with the piston 36 of the multiplier cylinder 28. This movement forces fluid out of the rod-side chamber 20 of the actuating cylinder 18, which pushes a piston (not shown) of the master cylinder 10 and the handlebar lever (not shown) back to its relaxed position and permits the clutch to fully engage.

As an alternative to the above arrangement of a power clutch actuating device, a spring or like mechanism (not shown) may be provided in the rod-side chamber 34 of the multiplier cylinder 28 to return the piston 36 and rod 40 to their original or normal positions. In addition, the secondary pressure source 26 may be a motor lubrication oil pressure source or a compressed air pressure source. If the secondary pressure source is a motor lubrication oil pressure source, then the power clutch actuating device would include a tank to which fluid may be directed to release the fluid pressure in the piston-side or rod-side chamber of the multiplier cylinder. Alternatively, if the secondary pressure source is a source of compressed air, then the power clutch actuating device could release the compressed air to ambient atmosphere to release the fluid pressure in the piston-side or rod-side chamber of the multiplier cylinder.

The dimensions of the multiplier cylinder 28 and actuating cylinder 18 may be selected to deliver a correct and/or desired amount of fluid pressure (P2) to the clutch slave cylinder 46 while substantially reducing the pressure (P1) required from the master cylinder 10 to actuate or disengage the clutch. By virtue of the reduced pressure requirement, the effort required by a motorcycle driver to squeeze the handlebar lever may be considerably reduced. The above referenced power clutch actuating device may be used on any motorized vehicle or equipment having a hydraulic clutch.

With respect to the embodiment shown in FIGS. 1 and 2, the fluid contained between the piston 22 of the actuating cylinder 18 and the slave cylinder 46 is necessarily sealed and isolated from the remaining system. Thus, fluid expansion or contraction caused from an increase or decrease in temperature will necessarily result in a variation in the lever or pedal position where the associated master cylinder develops pressure to actuate the slave cylinder. For purposes of addressing this problem, the actuating cylinder 18 as shown in FIGS. 1 and 2 is modified as shown in FIG. 3.

Figure 3:
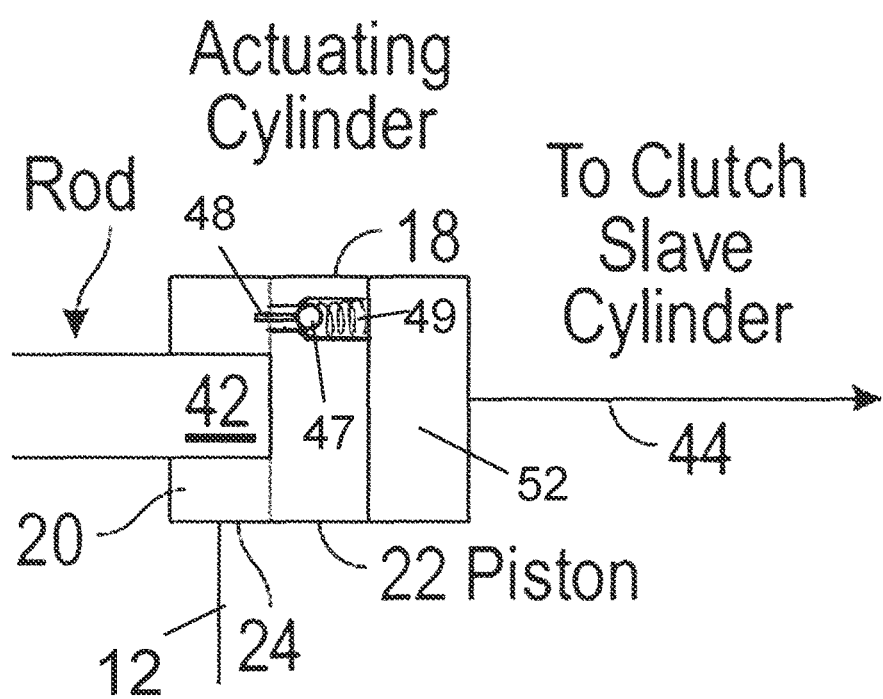
FIG. 3 is a portion of the clutch actuating device shown in FIGS. 1 and 2 modified to include a check valve according to an embodiment.

Thus, according to the embodiment shown in FIG. 3, the power clutch actuating device shown in FIGS. 1 and 2 is modified to account for fluid expansion or contraction due to temperature change of the fluid. This embodiment eliminates the variation in fluid volume due to temperature increase or decrease with the addition of a check valve 47 provided within and through the piston 22 of the actuating cylinder 18 (see FIG. 3). As shown in FIG. 3, the check valve 47 is a pilot-operated spring-loaded check valve including a pilot pin 48 and a spring 49.

In operation, when the master cylinder advances (i.e., the condition shown in FIG. 2), the pressure in the clutch actuation chamber 52 of the actuating cylinder 18 becomes higher than the rod-side chamber 20 of the actuating cylinder 18 because of the additional force (P2) provided by the multiplier cylinder 28 on the rod 42 of the actuating cylinder 18. This keeps the check valve 47 closed as shown in FIG. 3. However, when the master cylinder retracts (i.e., the condition shown in FIG. 1, the idle condition), the piston 22 of the actuating cylinder 18 also retracts (i.e., moves toward the left as illustrated in FIG. 3 toward an end wall or end cap 50 of the actuating cylinder 18). When the piston 22 of the actuating cylinder 18 fully retracts, the check valve 47 is forced to open due to the pilot pin 48 bearing against the end cap 50 of the actuating cylinder 18. In such a condition (i.e., check valve 47 in an open condition), fluid is permitted to flow through the check valve between the clutch actuation chamber 52 and the rod-side chamber 20 which connects to the master cylinder via conduit 12. At the same time, a passage in the master cylinder may be open to a reservoir, thus providing compensation for changes in fluid volume throughout the master cylinder to slave cylinder hydraulic control system.

Figure 4:
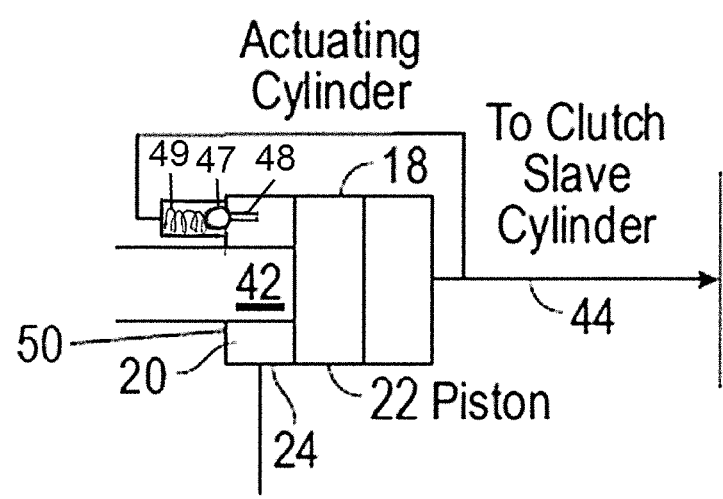
FIG. 4 is a portion of the clutch actuating device shown in FIGS. 1 and 2 modified to include a check valve according to an alternate embodiment.

Other locations of the pilot operated check valve are also contemplated and would work as well. For instance, locating the check valve external to the actuating cylinder (see FIG. 4). As another alternative, the check valve may be an electrically-operated type of valve instead of a mechanically-operated type of valve as discussed above.

Embodiments disclosed herein may be retrofitted to existing motorcycles or other vehicles with minimal modification to Original Equipment Manufacturer (OEM) design or can be included in new motorcycles or other vehicles without changing the OEM handlebar or the like, master cylinder, or the slave cylinder that actuates the clutch. Of course, the clutch actuating device may also be installed in other vehicles and equipment and is not limited to installations on motorcycles.

The foregoing description and specific embodiments are merely illustrative of the principles thereof, and various modifications and additions may be made to the apparatus by those skilled in the art, without departing from the spirit and scope of this invention.

The invention claimed is:

1. A clutch actuating device, comprising:
an actuating cylinder having a piston;
a multiplier cylinder having at least one port for connection to a secondary pressure source; and
a rod or a series of interconnecting rods extending from said multiplier cylinder to said piston of said actuating cylinder;
said actuating cylinder having a rod-side chamber through which said rod or rods pass and a clutch actuation chamber, and said piston separating said rod-side chamber from said clutch actuation chamber within said actuating cylinder;
said rod-side chamber having a port for connection to a first pressure source and said clutch actuation chamber having a port for connection to a slave cylinder of a hydraulic clutch; and
said rod-side chamber being in fluid connection with said clutch actuation chamber via a passage in which a check valve is located.

2. The clutch actuating device according to claim 1, wherein the check-valve is normally-closed preventing flow through said passage and when opened, permits flow between said rod-side chamber and said clutch actuation chamber.

3. The clutch actuating device according to claim 2, wherein said check valve is a mechanically-operated check valve or an electronically-operated check valve.

4. The clutch actuating device according to claim 2, wherein said passage extends externally of said actuating cylinder.

5. The clutch actuating device according to claim 2, wherein said passage extends through said piston.

6. The clutch actuating device according to claim 2, wherein said check valve includes a spring which urges said check valve in a closed position that prevents flow through said passage.

7. The clutch actuating device according to claim 2, wherein said check valve includes a pilot pin.

8. The clutch actuating device according to claim 2, wherein said passage extends through said piston, wherein said check valve includes a pilot pin extending outward of said piston into said rod-side chamber, and wherein said check valve is placed in an open position permitting flow through said passage when said pilot pin is pressed against a wall of the actuating cylinder due to movement of said piston toward said wall.

9. The clutch actuating device according to claim 2, wherein said passage extends internally of said actuating cylinder.

10. The clutch actuating device according to claim 1, wherein the clutch actuating device is installed between a master cylinder providing said first pressure source and the slave cylinder of the hydraulic clutch.

11. The clutch actuating device according to claim 1, wherein the clutch actuation chamber of said actuating cylinder is in fluid connection with the slave cylinder such that a clutch actuation fluid pressure produced in said actuating cylinder in response to movement of said piston in a direction toward said clutch actuation chamber is applied to the slave cylinder.

12. The clutch actuating device according to claim 1, wherein the secondary pressure source is a motor lubrication oil pressure source or a compressed air pressure source.

13. A hydraulic clutch actuating device operable via a clutch lever, comprising:
   a master cylinder having an output of hydraulic fluid at a first fluid pressure when the clutch lever is pulled;
   an actuating cylinder having a piston, rod-side chamber, and a clutch actuation chamber, the rod-side chamber being in fluid connection with the output of the master cylinder;
   a passage interconnecting the rod-side chamber with the clutch actuation chamber of the actuating cylinder, a check-valve being located in the passage;
   a slave cylinder in fluid connection with the clutch actuation chamber of the actuating cylinder;
   a multiplier cylinder having a piston-side chamber and a rod-side chamber separated by a piston;
   a rod or a series of interconnecting rods extending from the piston of the multiplier cylinder through the rod-side chamber of the multiplier cylinder to the piston of the actuating cylinder through the rod-side chamber of the actuating cylinder;
   a secondary pressure source; and
   a directional control valve including a pilot port in fluid connection with the output of the master cylinder, a port in fluid connection with the piston-side chamber of the multiplier cylinder, and a port in fluid connection with the secondary pressure source; and
   wherein, when the first fluid pressure (P1) from the master cylinder is simultaneously applied to the pilot port of the directional control valve and the rod-side chamber of the actuating cylinder, a second fluid pressure (P2) is applied to the piston-side chamber of the multiplier cylinder by the secondary pressure source via the directional control valve, such that the second fluid pressure (P2) transmitted by the rod or series of rods and the first fluid pressure (P1) jointly act on the piston of the actuating cylinder to produce a clutch actuation fluid pressure that is applied to the slave cylinder.

14. The hydraulic clutch actuating device according to claim 13, wherein, when the clutch lever is released and the first fluid pressure (P1) from the master cylinder is ceased to be applied to the pilot port of the directional control valve and the rod-side chamber of the actuating cylinder, the directional control valve shifts application of the second fluid pressure (P2) away from the piston-side chamber of the multiplier cylinder such that the piston of the multiplier cylinder is permitted to retract the rod or series of rods into the rod-side chamber of the multiplier cylinder and to retract the piston of the actuating cylinder toward the rod-side chamber of the actuating cylinder.

15. The hydraulic clutch actuating device according to claim 14, wherein the check-valve is normally-closed preventing flow through said passage and when opened, permits flow between said rod-side chamber and said clutch actuation chamber of said actuating cylinder.

16. The hydraulic clutch actuating device according to claim 15, wherein said passage extends through said piston.

17. The hydraulic clutch actuating device according to claim 16, wherein said check valve includes a spring which urges said check valve in a closed position that prevents flow through said passage.

18. The hydraulic clutch actuating device according to claim 17, wherein said check valve includes a pilot pin that extends outward of said piston into said rod-side chamber of said actuating cylinder, and wherein said check valve is placed in an open position permitting flow through said passage when said pilot pin is pressed against a wall of the actuating cylinder due to movement of said piston toward said wall.

19. A motorized vehicle having the hydraulic clutch actuating device according to claim 13.

20. The motorized vehicle according to claim 19 in which the motorized vehicle comprises a motorcycle.

* * * * *